United States Patent
Stallings et al.

(10) Patent No.: US 8,750,840 B2
(45) Date of Patent: Jun. 10, 2014

(54) DIRECTORY ASSISTANCE INFORMATION VIA EXECUTABLE SCRIPT

(75) Inventors: Heath Stallings, Colleyville, TX (US); Sok Y Hwang, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 773 days.

(21) Appl. No.: 12/650,132

(22) Filed: Dec. 30, 2009

(65) Prior Publication Data

US 2011/0159853 A1 Jun. 30, 2011

(51) Int. Cl.
*H04M 3/42* (2006.01)
(52) U.S. Cl.
USPC .................................................. 455/414.1
(58) Field of Classification Search
USPC .................................................. 455/414.1
See application file for complete search history.

(56) References Cited

U.S. PATENT DOCUMENTS

| | | |
|---|---|---|
| 5,509,049 A | 4/1996 | Peterson |
| 6,658,455 B1 | 12/2003 | Weinman |
| 2003/0069690 A1* | 4/2003 | Correia et al. ................. 701/211 |
| 2003/0130924 A1* | 7/2003 | Muldrow et al. ................ 705/37 |
| 2005/0197110 A1 | 9/2005 | Hasan et al. |
| 2006/0008071 A1 | 1/2006 | Martin et al. |
| 2007/0123280 A1 | 5/2007 | McGary et al. |
| 2008/0071554 A1 | 3/2008 | Miles et al. |
| 2009/0175264 A1* | 7/2009 | Reitalu et al. ................. 370/352 |
| 2009/0190739 A1* | 7/2009 | McGary et al. ........... 379/218.01 |

* cited by examiner

*Primary Examiner* — Ankur Jain

(57) ABSTRACT

A device provides a directory assistance request to a directory assistance server, and receives, from the directory assistance server, a script that includes auto-dial instructions and contact list instructions. The device executes the auto-dial instructions of the script to cause the device to automatically dial a telephone number requested by the directory assistance request, and executes the contact list instructions of the script to cause the device to selectively provide contact information, requested by the directory assistance request, in a contact list associated with the device.

25 Claims, 13 Drawing Sheets

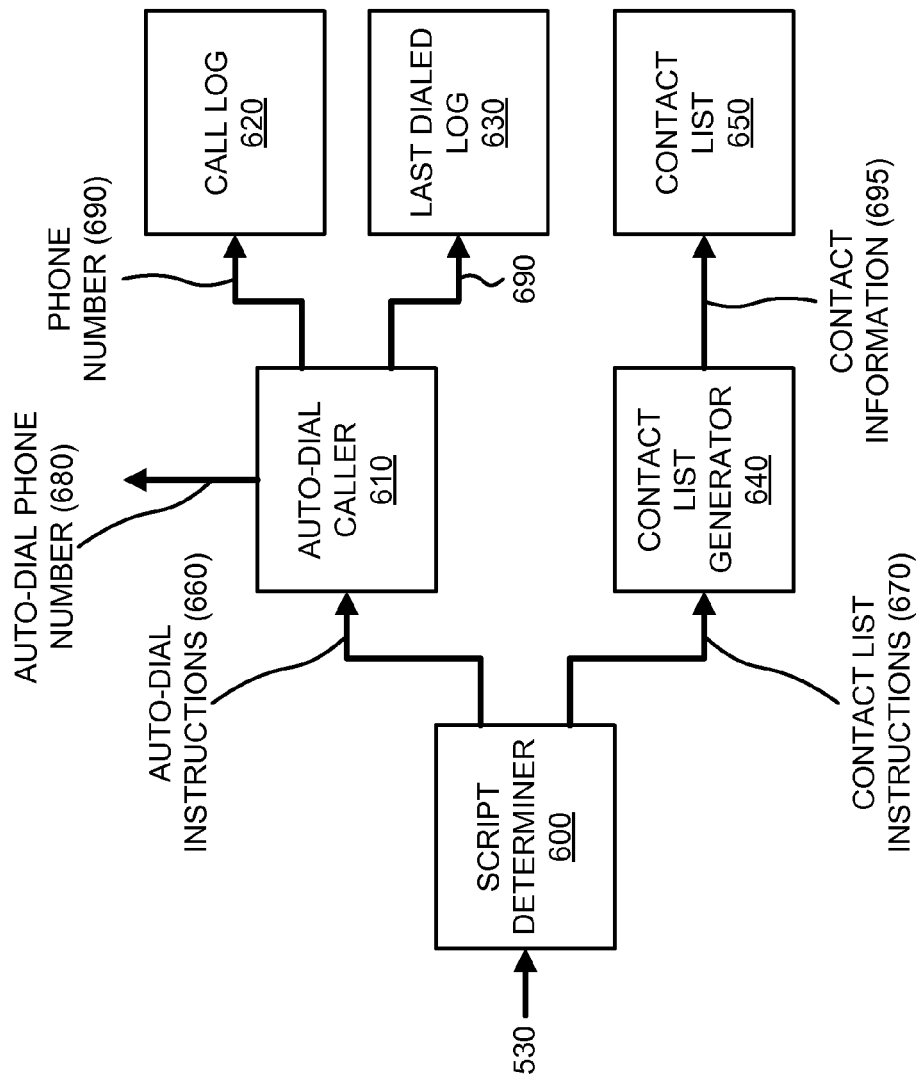

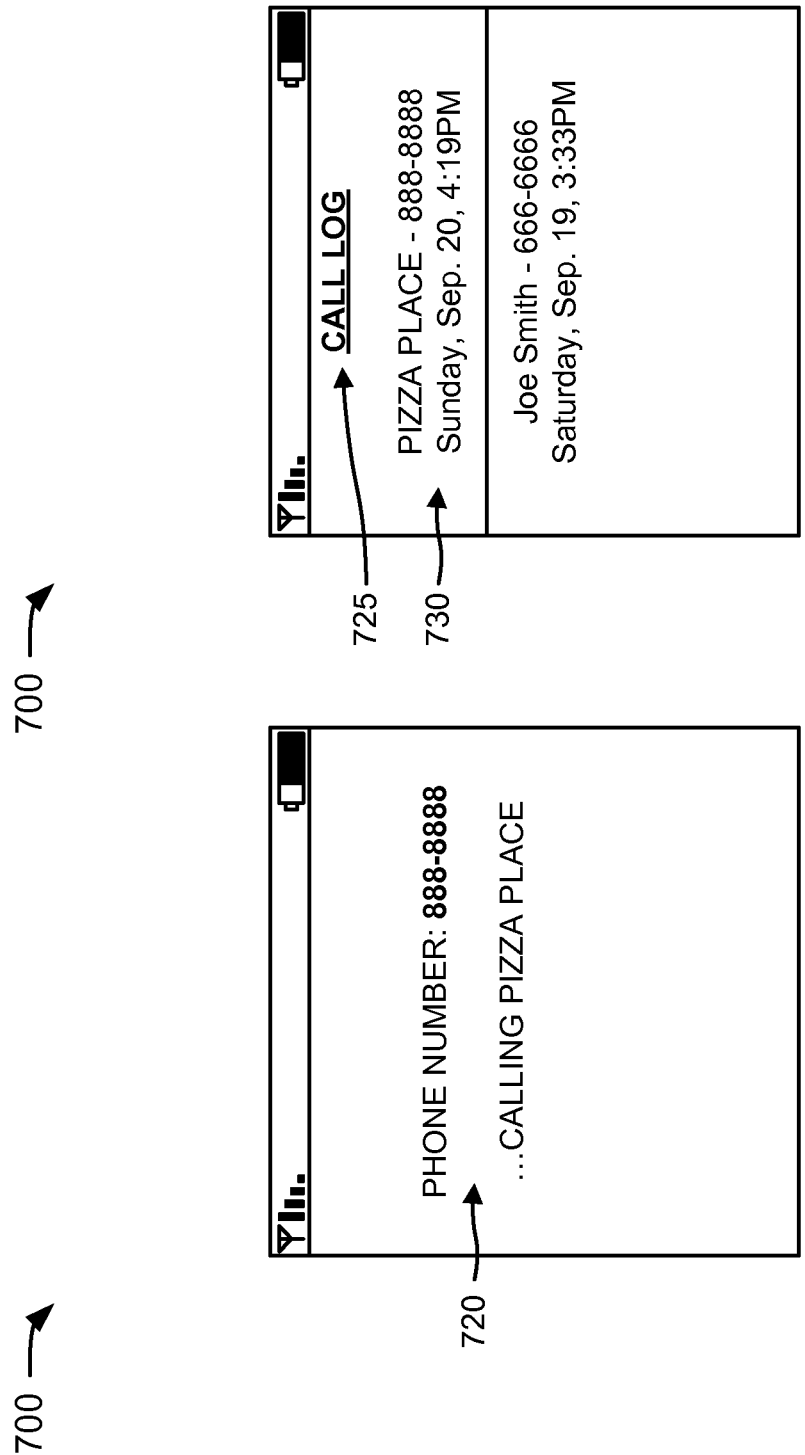

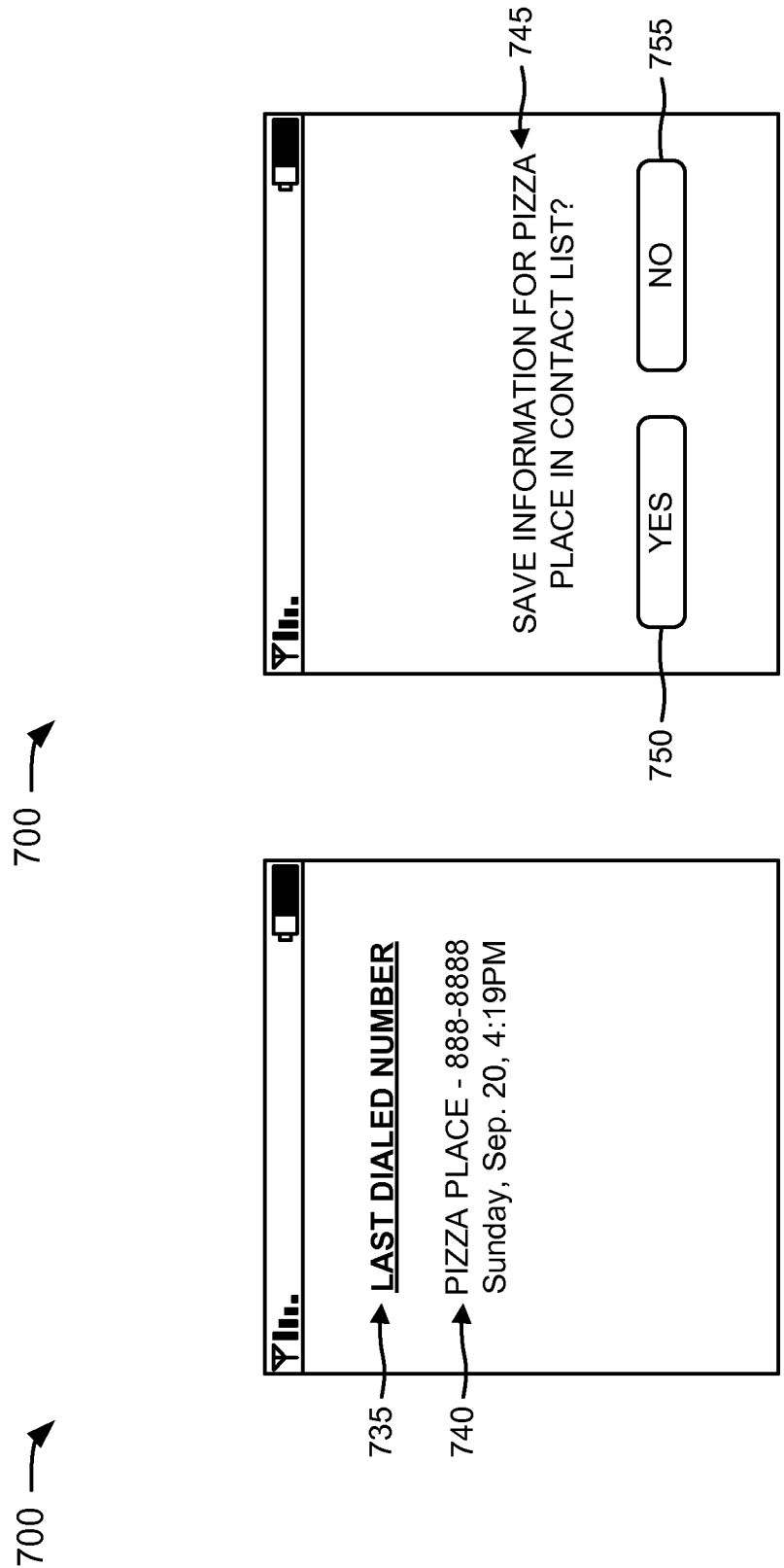

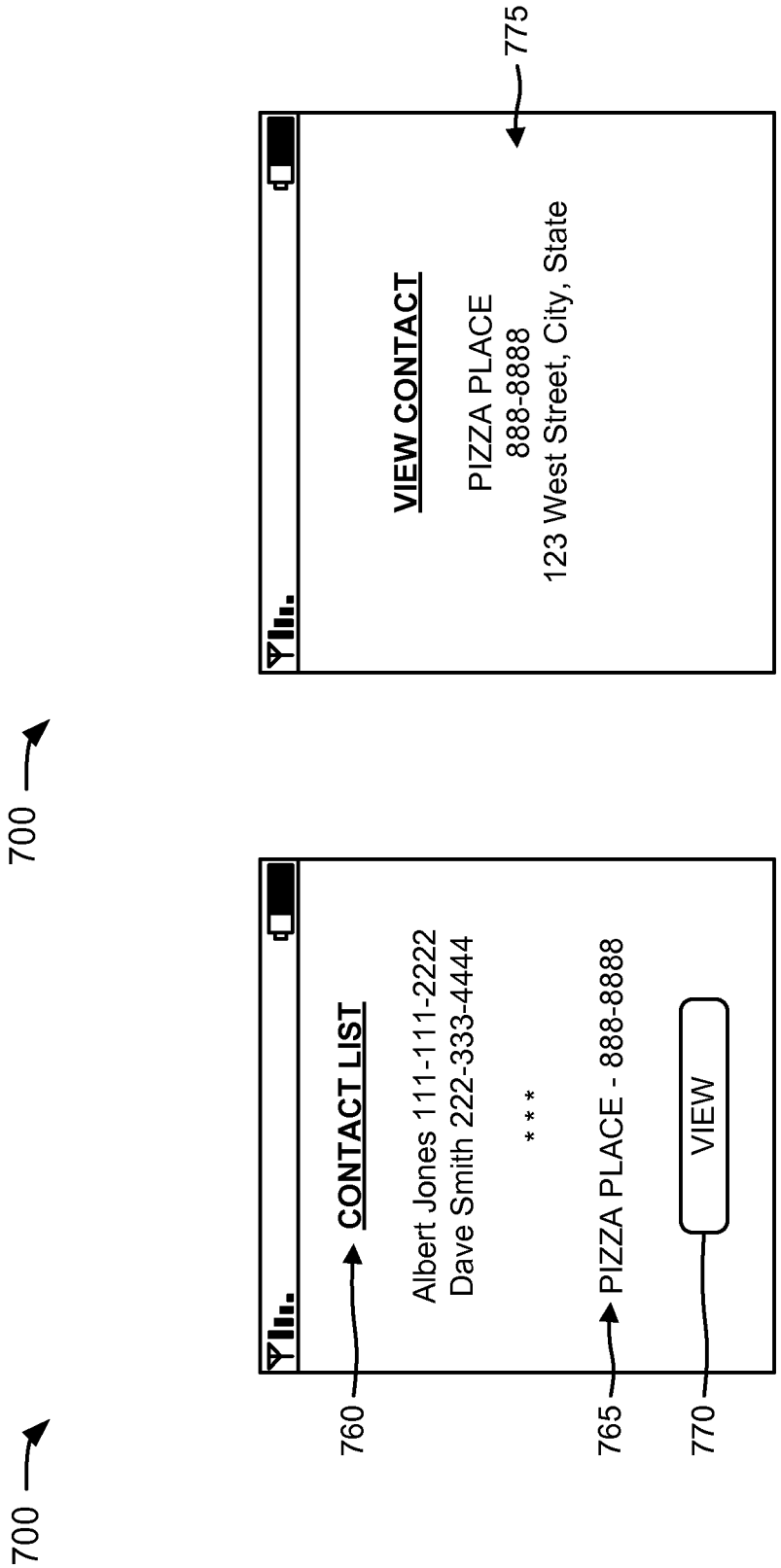

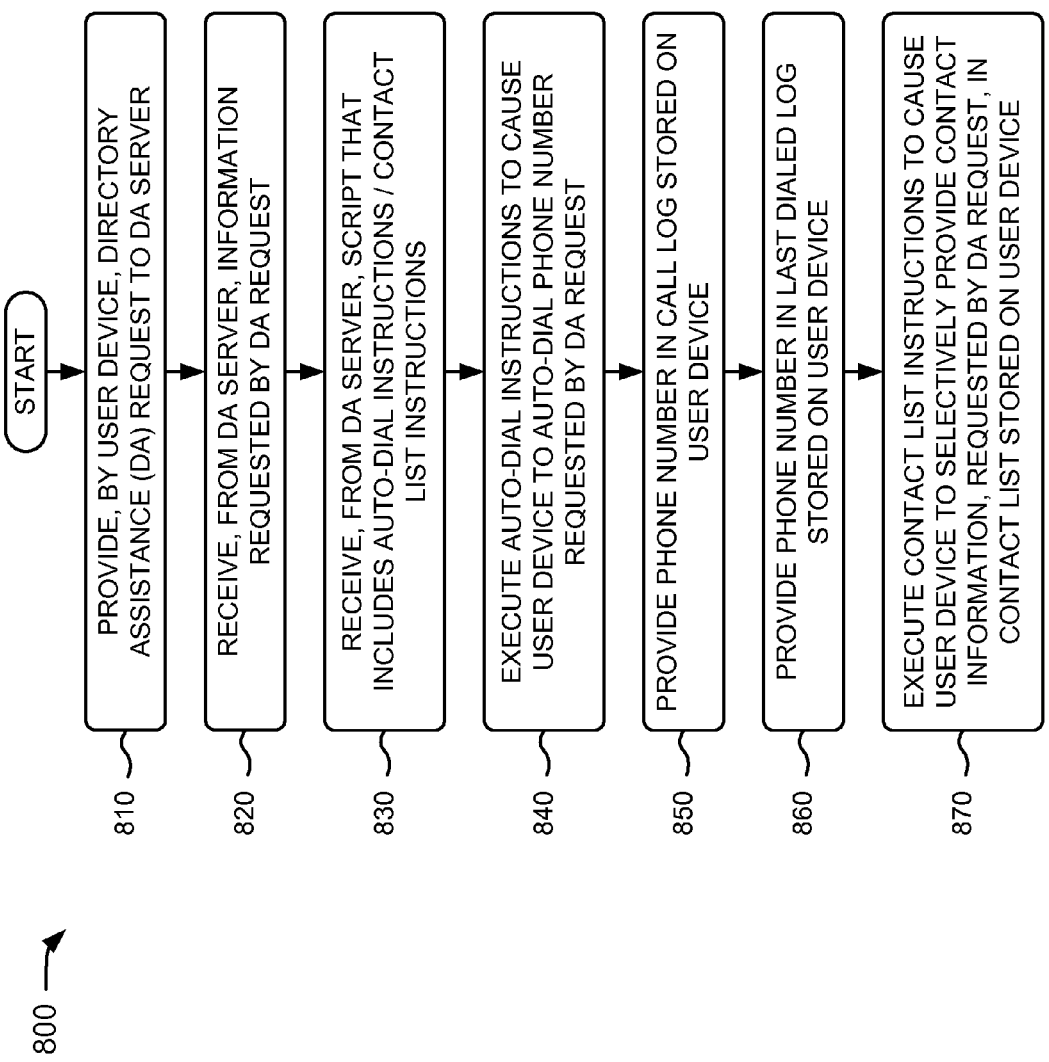

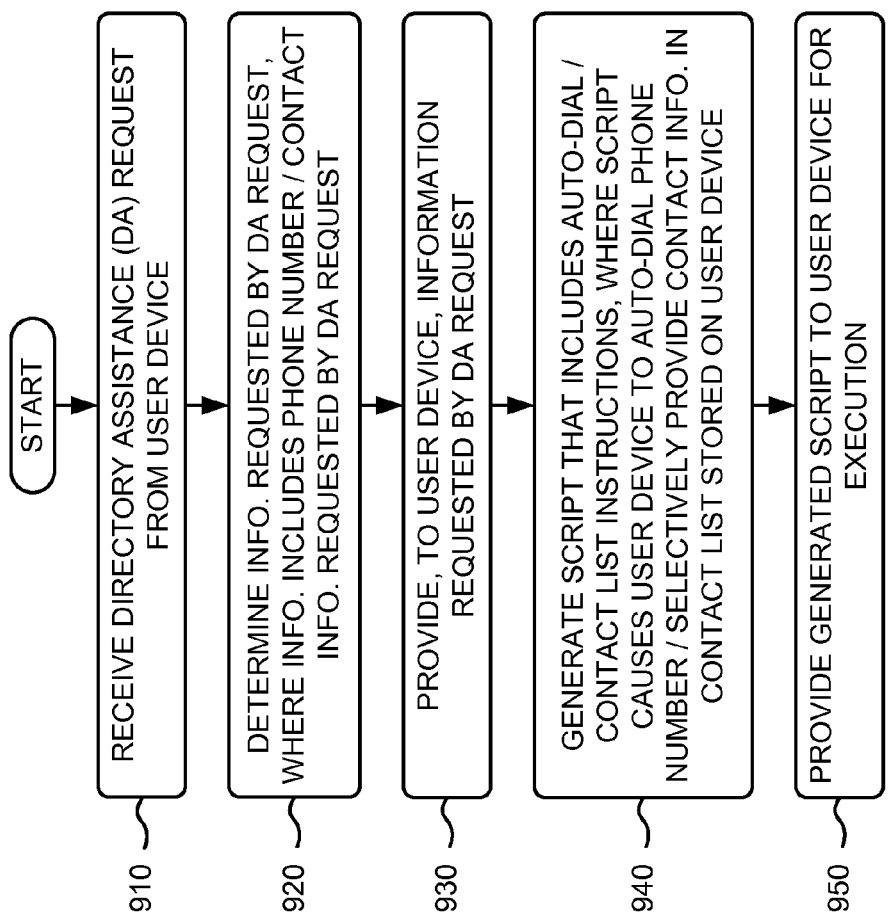

DIRECTORY ASSISTANCE INFORMATION VIA EXECUTABLE SCRIPT

BACKGROUND

Directory assistance is a telecommunications service used to find out a specific telephone number and/or address of a residence, business, etc. In a typical directory assistance scenario, a caller may request a telephone number of a residence or business, and a directory assistance system may locate the telephone number and may audibly provide the located telephone number to the caller. Alternatively, the directory assistance system may dial the located telephone number and may connect the caller to the residence or business via the dialed telephone number.

Many directory assistance systems use custom database software to locate listings quickly and automated read back systems to provide a requested telephone number. This enables a directory assistance operator to move on to another caller as soon as a correct listing is located. Some directory assistance systems utilize "store and forward" technology that records a "city and state" requested by a caller and plays the city and state speech to a directory assistance operator before the operator connects with the caller. Many directory assistance systems include interactive voice response systems that utilize speech recognition and recorded speech or speech synthesis to handle a directory assistance call without live operator intervention.

In North America, directory assistance may be accessed by dialing "411" or by dialing "1-area code-555-1212" (e.g., to get a listing in a remote or non-local area code). However, a "411" landline call may provide local listings as well as nationwide listings and sometimes international listings. Most telephone companies permit up to two listings per "411" call. Wireless carriers offer nationwide listings with "411" and some offer additional enhanced directory assistance services. Wireless carriers may audibly provide a "411" listing to a mobile communication device (e.g., a cell phone, a personal digital assistant (PDA), a global positioning system (GPS) navigation device, etc.). Alternatively, wireless carriers may dial a telephone number (e.g., associated with the "411" listing) and may connect the mobile communication device to the residence or business via the dialed telephone number.

BRIEF DESCRIPTION OF THE DRAWINGS

FIG. 6 illustrates a diagram of exemplary functional components of the user device depicted in FIGS. 1, 3, and 4;

FIGS. 7A-7G depict diagrams of exemplary user interfaces capable of being generated by the user device illustrated in FIGS. 1, 3, and 4;

FIG. 8 illustrates a flow chart of an exemplary process for executing a script that causes a user device to auto-dial a telephone number and to selectively provide contact information in a contact list according to implementations described herein; and FIGS. 9 and 10 depict flow charts of an exemplary process for providing, to a user device, a script that causes the user device to auto-dial a telephone number and to selectively provide contact information in a contact list according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may enable a directory assistance server to provide a script to a user device in response to a directory assistance request. The script may cause the user device to automatically dial (auto-dial) a telephone number requested by the directory assistance request and may cause the user device to selectively store contact information, requested by the directory assistance request, in a contact list. In one implementation, for example, the systems and/or methods may provide, by a user device, a directory assistance (DA) request to a DA server, and may receive, from the DA server, information requested by the DA request. The systems and/or methods may receive, from the DA server, a script that includes auto-dial instructions and/or contact list instructions, and may execute the auto-dial instructions to cause the user device to auto-dial a telephone number requested by the DA request. The systems and/or methods may provide the telephone number in a call log and/or a last dialed log stored on the user device, and may execute the contact list instructions to cause the user device to selectively provide contact information, requested by the DA request, in a contact list stored on the user device.

As used herein, the terms "user" or "caller" are intended to be broadly interpreted to include a user device or a user of a user device.

Figure 1:
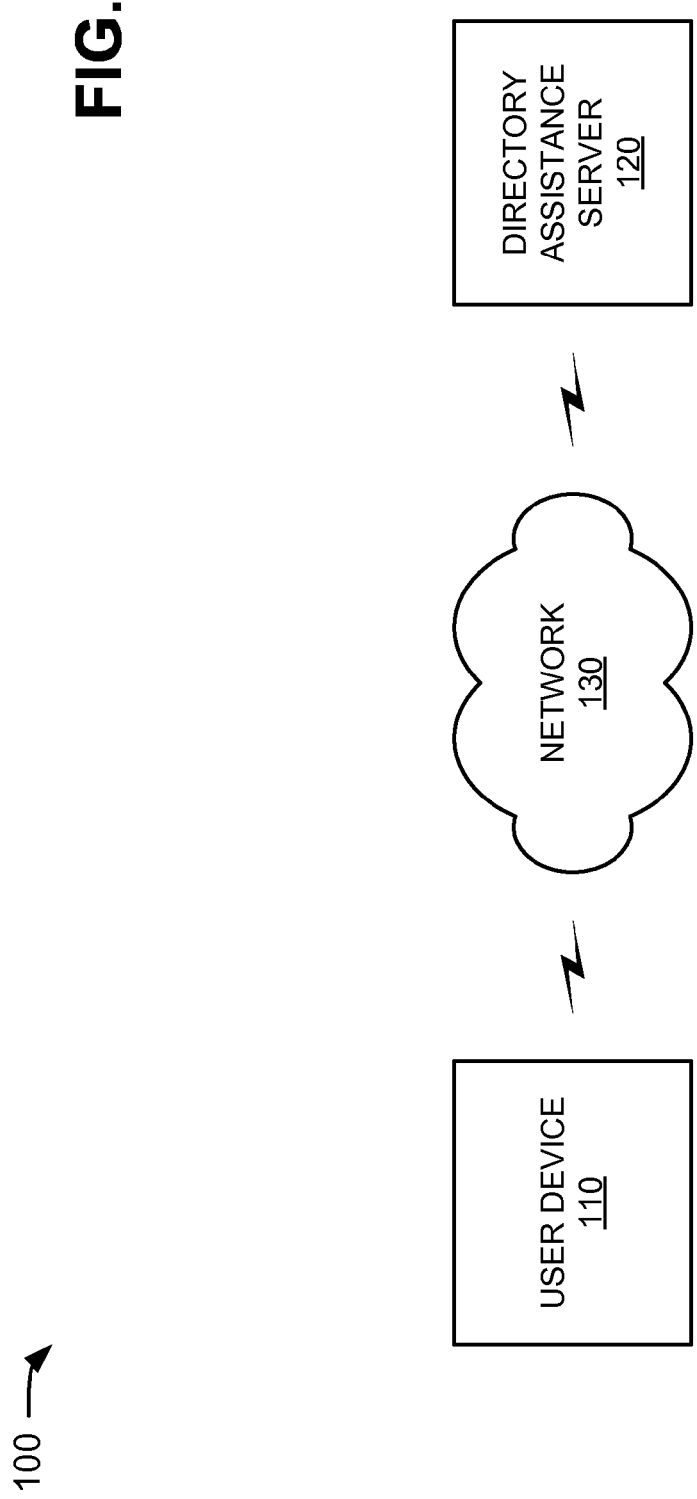
FIG. 1 depicts a diagram of an exemplary network in which systems and/or methods described herein may be implemented.

FIG. 1 is a diagram of an exemplary network 100 in which systems and/or methods described herein may be implemented. As illustrated, network 100 may include a user device 110 and a directory assistance server 120 interconnected by a network 130. Components of network 100 may interconnect via wired and/or wireless connections. A single user device 110, directory assistance server 120, and network 130 have been illustrated in FIG. 1 for simplicity. In practice, there may be more user devices 110, directory assistance servers 120, and/or networks 130. Also, in some instances, one or more of the components of network 100 may perform one or more functions described as being performed by another one or more of the components of network 100.

User device 110 may include any device (e.g., a mobile communication device) that is capable of accessing directory assistance server 120 via network 130. For example, user device 110 may include a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a radiotelephone, a wireless device (e.g., a wireless telephone), a cellular telephone, a smart phone, a laptop computer with a broadband air card, a landline telephone, a GPS navigation device, an Internet protocol (IP)-based device, or other types of computation or communication devices. In one exemplary implementation, user device 110 may receive a script that includes auto-dial instructions and/or contact list instructions, and may execute the auto-dial instructions to cause user device 110 to auto-dial a telephone number requested by a directory assistance (DA) request. User device 110 may provide the telephone number in a call log and/or a last dialed log stored on user device 110, and may execute the contact list instructions to cause user device 110 to selectively provide contact information, requested by the DA request, in a contact list stored on user device 110.

Directory assistance server 120 may include one or more server devices, or other types of computation or communication devices, that gather, process, search, and/or provide information in a manner described herein. In one exemplary implementation, directory assistance server 120 may receive a directory assistance (DA) request from user device 110, and may determine information requested by the DA request, where the information may include a telephone number and/or contact information requested by the DA request. Directory assistance server 120 may provide the information requested by the DA request to user device 110, and may generate a script that includes auto-dial instructions and/or contact list instructions. The script may cause user device 110 to auto-dial the telephone number and/or to selectively provide the contact information in a contact list stored on user device 110. Directory assistance server 120 may provide the script to user device 110 for execution.

Network 130 may include a local area network (LAN), a wide area network (WAN), a metropolitan area network (MAN), a telephone network, such as the Public Switched Telephone Network (PSTN), a cellular network, a Wi-Fi network, an intranet, the Internet, an optical fiber (or fiber optic)-based network, or a combination of networks.

Although FIG. 1 shows exemplary components of network 100, in other implementations, network 100 may contain fewer, different, differently arranged, or additional components than depicted in FIG. 1.

Figure 2:
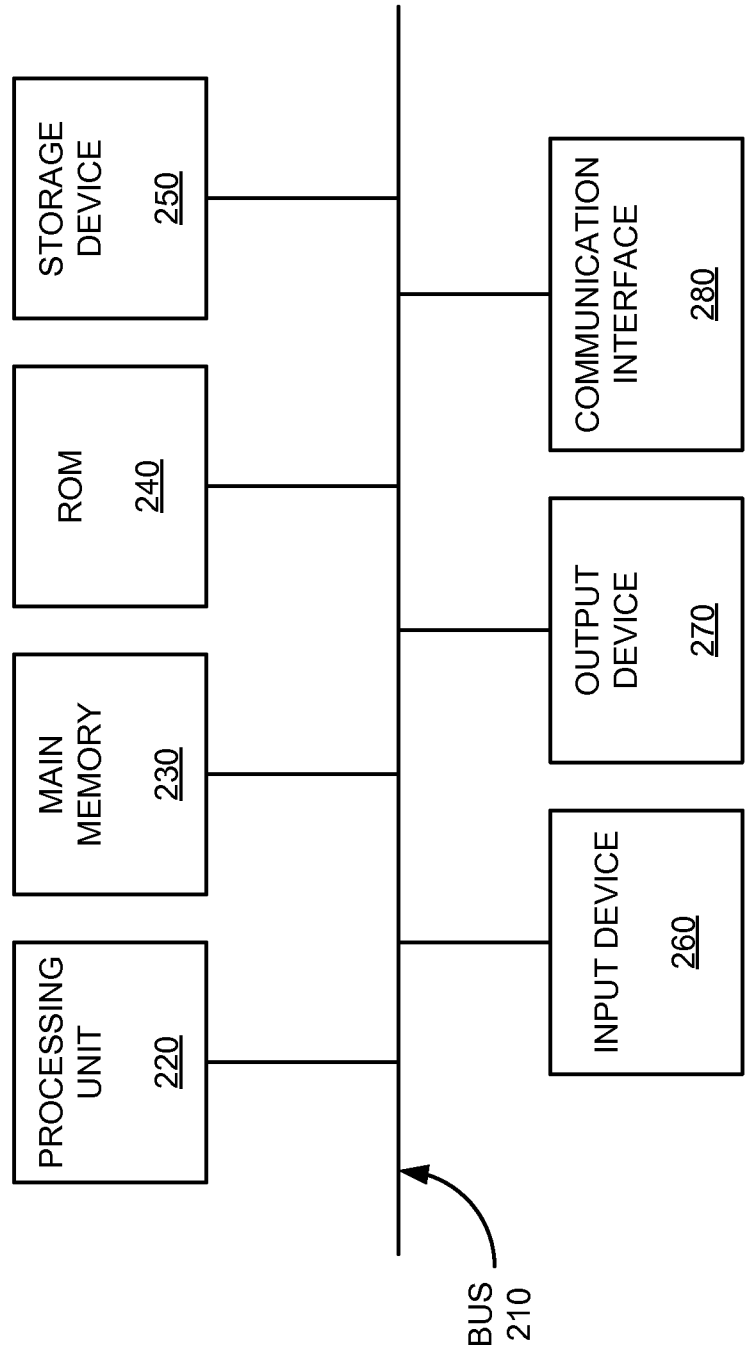
FIG. 2 illustrates a diagram of exemplary components of a directory assistance server of the network depicted in FIG. 1.

FIG. 2 illustrates a diagram of exemplary components of a device 200 that may correspond to directory assistance server 120. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 130.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of device 200.

Figure 3:
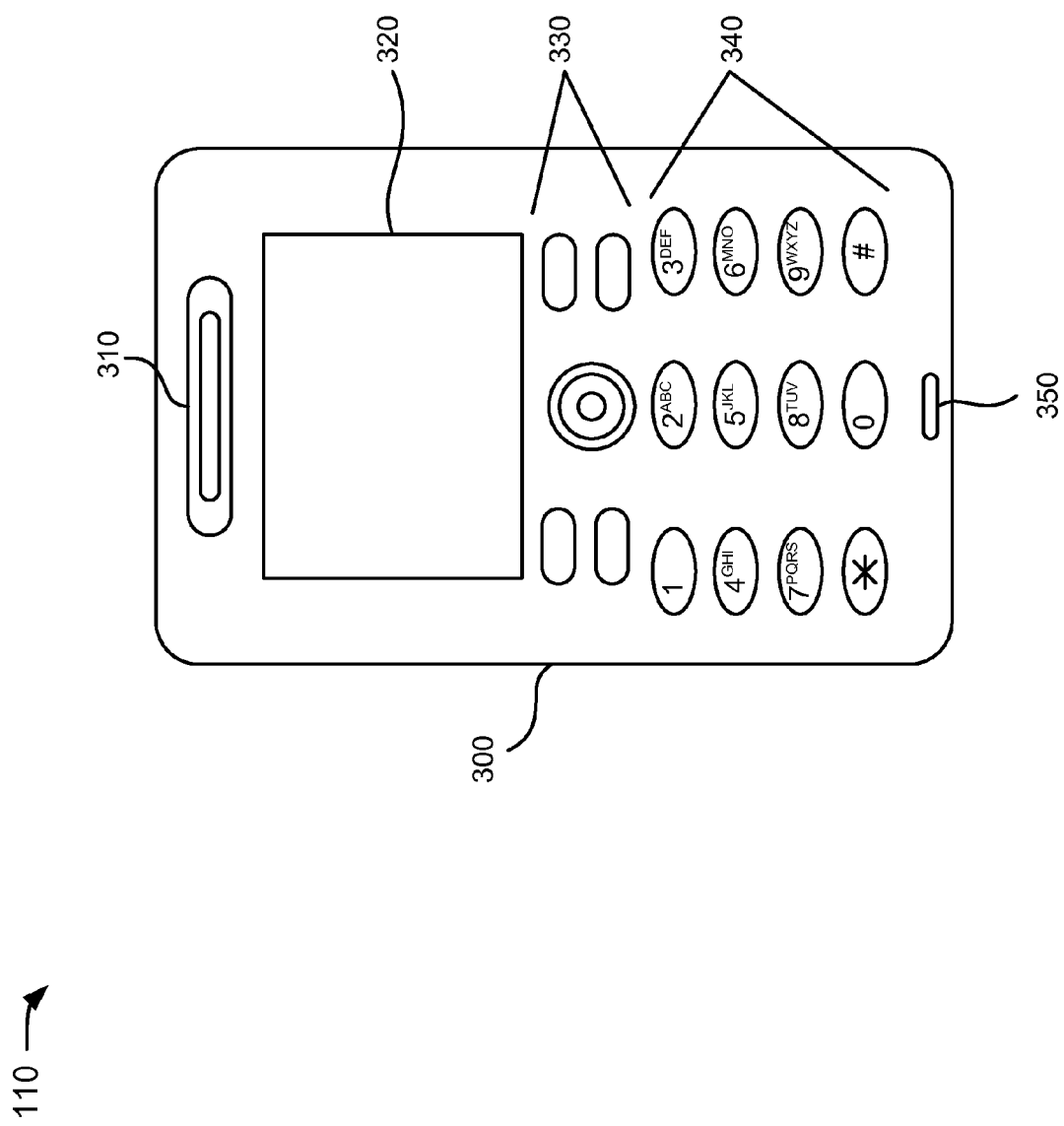
FIG. 3 depicts a diagram of an exemplary user device of the network illustrated in FIG. 1.

FIG. 3 depicts a diagram of an exemplary user device 110. As illustrated, user device 110 may include a housing 300, a speaker 310, a display 320, control buttons 330, a keypad 340, and/or a microphone 350. Housing 300 may protect the components of user device 110 from outside elements. Speaker 310 may provide audible information to a user of user device 110.

Display 320 may provide visual information to the user. For example, display 320 may display text input into user device 110; text, images, video, and/or graphics received from another device; and/or information regarding incoming or outgoing calls or text messages, emails, media, games, phone books, address books, the current time, directional assistance information (e.g., a telephone number and/or address of a residence or business requested by a "411" request), etc. Control buttons 330 may permit the user to interact with user device 110 to cause user device 110 to perform one or more operations. For example, control buttons 330 may be used to cause user device 110 to transmit information. Keypad 340 may include a standard telephone keypad. Microphone 350 may receive audible information from the user.

Although FIG. 3 shows exemplary components of user device 110, in other implementations, user device 110 may contain fewer, different, differently arranged, or additional components than depicted in FIG. 3. In still other implementations, one or more components of user device 110 may perform one or more other tasks described as being performed by one or more other components of user device 110.

Figure 4:
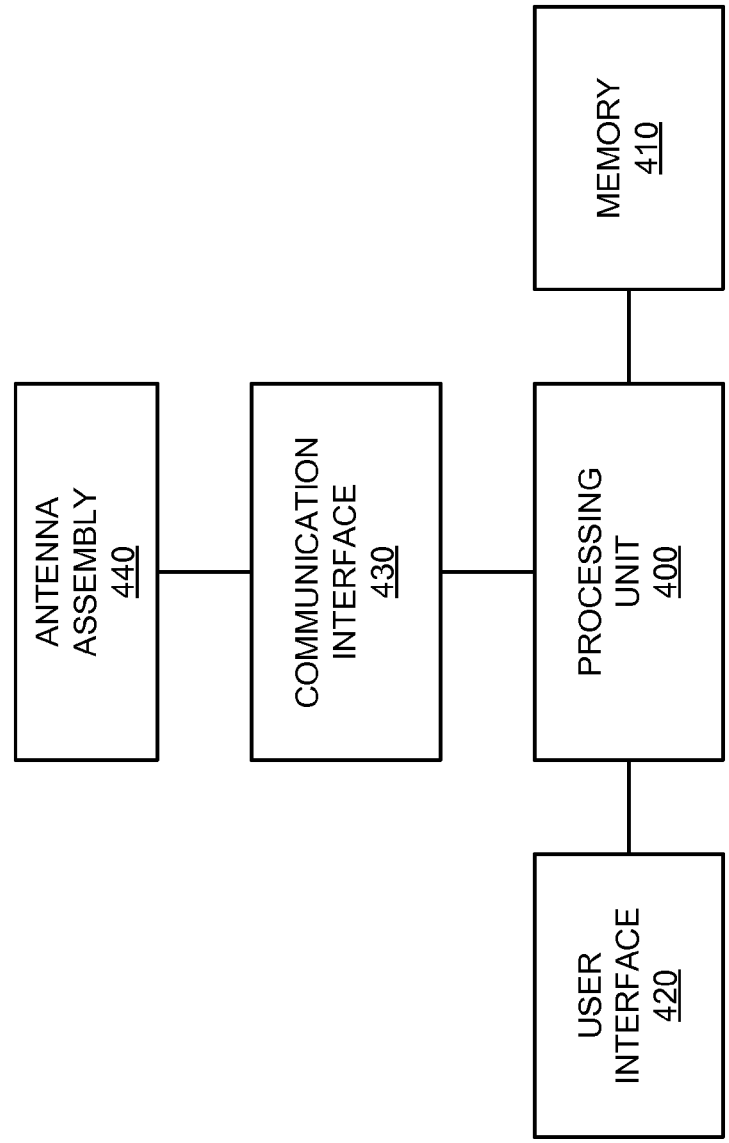
FIG. 4 illustrates a diagram of exemplary components of the user device depicted in FIG. 3.

FIG. 4 illustrates a diagram of exemplary components of user device 110. As shown, user device 110 may include a processing unit 400, memory 410, a user interface 420, a communication interface 430, and/or an antenna assembly 440. Components of user device 110 may interconnect via wired and/or wireless connections.

Processing unit 400 may include one or more processors, microprocessors, application specific integrated circuits (ASICs), field programmable gate arrays (FPGAs), or the like. Processing unit 400 may control operation of user device 110 and its components. In one implementation, processing unit 400 may control operation of components of user device 110 in a manner described herein.

Memory 410 may include a RAM, a ROM, and/or another type of memory to store data and instructions that may be used by processing unit 400.

User interface 420 may include mechanisms for inputting information to user device 110 and/or for outputting information from user device 110. Examples of input and output mechanisms might include buttons (e.g., control buttons 330, keys of keypad 340, a joystick, etc.) or a touch screen interface to permit data and control commands to be input into user device 110; a speaker (e.g., speaker 310) to receive electrical signals and output audio signals; a microphone (e.g., microphone 350) to receive audio signals and output electrical signals; a display (e.g., display 320) to output visual information (e.g., text input into user device 110); and/or a vibrator to cause user device 110 to vibrate.

Communication interface 430 may include, for example, a transmitter that may convert baseband signals from processing unit 400 to radio frequency (RF) signals and/or a receiver that may convert RF signals to baseband signals. Alternatively, communication interface 430 may include a transceiver to perform functions of both a transmitter and a receiver. Communication interface 430 may connect to antenna assembly 440 for transmission and/or reception of the RF signals.

Antenna assembly 440 may include one or more antennas to transmit and/or receive RF signals over the air. Antenna assembly 440 may, for example, receive RF signals from communication interface 430 and transmit them over the air, and receive RF signals over the air and provide them to communication interface 430. In one implementation, for example, communication interface 430 may communicate with a network and/or devices connected to a network (e.g., network 130).

As will be described in detail below, user device 110 may perform certain operations described herein in response to processing unit 400 executing software instructions of an application contained in a computer-readable medium, such as memory 410. The software instructions may be read into memory 410 from another computer-readable medium or from another device via communication interface 430. The software instructions contained in memory 410 may cause processing unit 400 to perform processes that will be described later. Alternatively, hardwired circuitry may be used in place of or in combination with software instructions to implement processes described herein. Thus, implementations described herein are not limited to any specific combination of hardware circuitry and software.

Although FIG. 4 shows exemplary components of user device 110, in other implementations, user device 110 may contain fewer, different, differently arranged, or additional components than depicted in FIG. 4. In still other implementations, one or more components of user device 110 may perform one or more other tasks described as being performed by one or more other components of user device 110.

Figure 5:
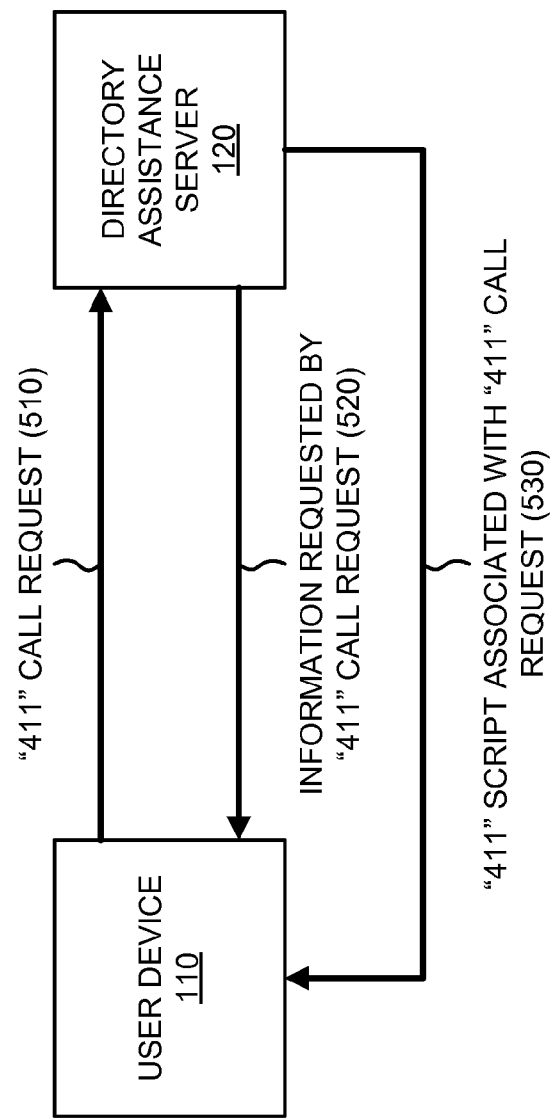
FIG. 5 depicts a diagram of exemplary operations capable of being performed by an exemplary portion of the network illustrated in FIG. 1.

FIG. 5 depicts a diagram of exemplary operations capable of being performed by an exemplary portion 500 of network 100. As illustrated, exemplary network portion 500 may include user device 110 and directory assistance server 120. User device 110 and directory assistance server 120 may include the features described above in connection with, for example, FIGS. 1-4.

As further shown in FIG. 5, a user (e.g., via user device 110) may provide a directory assistance (e.g., a "411" or "4-1-1") call request 510 to directory assistance server 120. "411" call request 510 may include a request for a specific telephone number and/or address of a residence, business, etc. In one example, "411" call request 510 may include a user's audible request for a specific telephone number and/or address of a residence, business, etc. In another example, "411" call request 510 may include a textual request (e.g., provided via a text message entered by the user via user device 110) for a specific telephone number and/or address of a residence, business, etc.

Directory assistance server 120 may receive "411" call request 510 and may determine information 520 requested by "411" call request 510. In one exemplary implementation, directory assistance server 120 may include an interactive voice response system that utilizes speech recognition and recorded speech or speech synthesis to handle "411" call request 510 without live operator intervention. In another exemplary implementation, directory assistance server 120 may use database software to locate information 520 quickly, and may use an automated read back system to provide information 520. Information 520 may include a telephone number and/or contact information (e.g., an address, a map, a business name, a person's name, etc.) of a residence, business, etc. requested by "411" call request 510. Directory assistance server 120 may provide information 520 to user device 110 (e.g., via audible feedback, a text message, etc.).

Based on "411" call request 510 and/or information 520, directory assistance server 120 may generate a "411" script 530 (e.g., associated with "411" call request 510) that includes auto-dial instructions, contact list instructions, and/or information 520. "411" script 530 (e.g., via the auto-dial and/or contact list instructions) may cause user device 110 to auto-dial the telephone number requested by "411" call request 510 and/or to selectively provide the contact information (e.g., requested by "411" call request 510) in a contact list stored on user device 110. Directory assistance server 120 may provide "411" script 530 to user device 110 for execution. User device 110 may receive "411" script 530 and may execute "411" script 530 as set forth below in connection with FIG. 6.

Although FIG. 5 shows exemplary components of network portion 500, in other implementations, network portion 500 may contain fewer, different, differently arranged, or additional components than depicted in FIG. 5. In still other implementations, one or more components of network portion 500 may perform one or more other tasks described as being performed by one or more other components of network portion 500.

FIG. 6 illustrates a diagram of exemplary functional components of user device 110. In one implementation, the functions described in connection with FIG. 6 may be performed by one or more components (e.g., depicted in FIGS. 3 and 4) of user device 110. As shown in FIG. 6, user device 110 may include a script determiner 600, an auto-dial caller 610, a call log 620, a last dialed log 630, a contact list generator 640, and a contact list 650.

Script determiner 600 may include hardware or a combination of hardware and software that may receive "411" script 530 from directory assistance server 120, and may determine (e.g., parse, extract, etc.) information 520, auto-dial instructions 660, and/or contact list instructions 670 from "411" script 530. Auto-dial instructions 660 may include one or more instructions that (e.g., when executed by processing unit 400) may cause user device 110 to auto-dial a telephone number requested by "411" call request 510. Contact list instructions 670 may include one or more instructions that (e.g., when executed by processing unit 400) may cause user device 110 to selectively provide (e.g., based on user interaction with user device 110) contact information, requested by "411" call request 510, in a contact list stored on user device 110. As further shown in FIG. 6, script determiner 600 may provide auto-dial instructions 660 to auto-dial caller 610 and may provide contact list instructions 670 to contact list generator 640.

Auto-dial caller 610 may include hardware or a combination of hardware and software that may receive auto-dial instructions 660 from script determiner 600, and may execute auto-dial instructions 660, which may cause user device 110 to automatically dial (auto-dial) 680 a telephone (phone) number 690 requested by "411" call request 510. In one example, auto-dial caller 610 (e.g., based on user device 110 execution of auto-dial instructions 660) may store telephone number 690 in call log 620 stored on user device 110 (e.g., in memory 410). Alternatively and/or additionally, call log 620 may be stored in a device other than user device 110 (e.g., but may be accessible to user device 110) and may include call information, such as type of calls, times, dates, telephone numbers, call lengths, etc. In another example, auto-dial caller 610 (e.g., based on user device 110 execution of auto-dial instructions 660) may store telephone number 690 in last dialed log 630 stored on user device 110 (e.g., in memory 410). Alternatively and/or additionally, last dialed log 630 may be stored in a device other than user device 110 (e.g., but may be accessible to user device 110) and may include call information (e.g., time, date, telephone number, call length, etc.) associated with a last dialed call by user device 110.

Contact list generator 640 may include hardware or a combination of hardware and software that may receive contact list instructions 670 from script determiner 600, and may execute contact list instructions 670, which may cause user device 110 to selectively provide contact information 695 (e.g., an address, a map, a business name, a person's name, etc.), requested by "411" call request 510, in contact list 650 stored on user device 110 (e.g., in memory 410). Alternatively and/or additionally, contact list 650 may be stored in a device other than user device 110 (e.g., but may be accessible to user device 110) and may include a list of contacts associated with the user of user device 110.

Although FIG. 6 shows exemplary functional components of user device 110, in other implementations, user device 110 may contain fewer, different, differently arranged, or additional functional components than depicted in FIG. 6. In still other implementations, one or more functional components of user device 110 may perform one or more other tasks described as being performed by one or more other functional components of user device 110.

FIGS. 7A-7G depict diagrams of exemplary user interfaces 700 capable of being generated by user device 110. User interfaces 700 may include graphical user interfaces (GUIs) or non-graphical user interfaces, such as text-based interfaces. User interfaces 700 may provide information to users via customized interfaces (e.g., proprietary interfaces) and/or other types of interfaces (e.g., browser-based interfaces, television interfaces, etc.). User interfaces 700 may receive user inputs via one or more input devices, may be user-configurable (e.g., a user may change the size of user interfaces 700, information displayed in user interfaces 700, color schemes used by user interfaces 700, positions of text, images, icons, windows, etc., in user interfaces 700, etc.), and/or may not be user-configurable. User interfaces 700 may be displayed to a user via one or more output devices (e.g., via display 320).

Figure 7A:
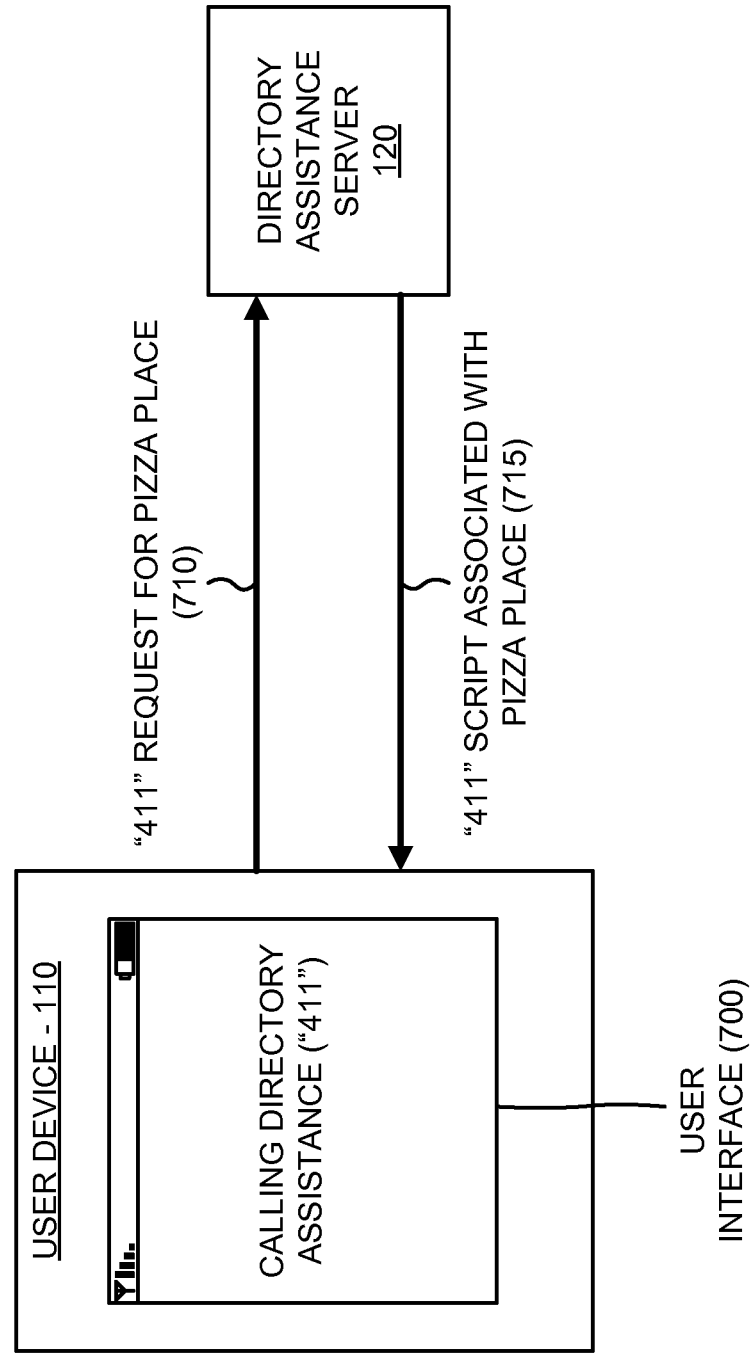

As shown in FIG. 7A, user interface 700 may include information (e.g., "calling directory assistance") associated with a directory assistance (e.g., a "411") call. The directory assistance call may connect to directory assistance server 120, and a user (e.g., via user device 110) may provide a "411" request 710 for a pizza place to directory assistance server 120. "411" request 710 may include a request for a specific telephone number and/or contact information of the pizza place, and may include the features described above in connection with "411" call request 510. Based on "411" request 710, directory assistance server 120 may provide a "411" script 715 associated with the pizza place to user device 110. "411" script 715 may include the features described above in connection with "411" script 530, and may cause user device 110 to perform certain operations when executed by user device 110.

For example, "411" script 715 may cause user device 110 to auto-dial the telephone number of the pizza place (e.g., "888-8888") and may cause user device 110 to present the user interface depicted in FIG. 7B. As shown in FIG. 7B, the user may be presented with the telephone number of the pizza place and information (e.g., "calling pizza place") associated with the telephone call to the pizza place, as shown by reference number 720.

In one exemplary implementation, auto-dialing the telephone number of the pizza place may cause user device 110 to provide the pizza place's telephone number in a call log stored on user device 110. In another exemplary implementation, "411" script 715 may cause user device 110 to provide the pizza place's telephone number in the call log stored on user device 110. The user interface depicted in FIG. 7C may present the call log to the user. As shown in FIG. 7C, the user may be presented with call information 725 provided in the call log and call information 730 associated with the telephone call to the pizza place. Call information 725 may include times, dates, telephone numbers, call lengths, etc. associated with calls made by user device 110. Call information 730 may include a time, a date, a telephone number, a call length, etc. associated with the call to the pizza place.

In an exemplary implementation, auto-dialing the telephone number of the pizza place may cause user device 110 to provide the pizza place's telephone number in a last dialed log stored on user device 110. In another exemplary implementation, "411" script 715 may cause user device 110 to provide the pizza place's telephone number in the last dialed log stored on user device 110. The user interface depicted in FIG. 7D may present the last dialed log to the user. As shown in FIG. 7D, the user may be presented with call information 735 provided in the last dialed log and call information 740 associated with the telephone call to the pizza place. Call information 735 may include times, dates, telephone numbers, call lengths, etc. associated with the most recent calls made by user device 110. Call information 740 may include a time, a date, a telephone number, a call length, etc. associated with the call to the pizza place.

In another example, "411" script 715 may cause user device 110 to selectively provide contact information associated with the pizza place in a contact list stored on user device 110, and may cause user device 110 to present the user interface depicted in FIG. 7E. As shown in FIG. 7E, the user may be presented with an option 745 to save the pizza place's contact information in the contact list and input mechanisms 750/755 (e.g., buttons, icons, and/or other similar input mechanisms). If the user selects the "Yes" input mechanism 750, user device 110 may save the pizza place's contact information in the contact list. If the user selects the "No" input mechanism 755, user device 110 may not save the pizza place's contact information in the contact list.

If user device 110 saves the pizza place's contact information in the contact list, the contact list may include the information presented with the user interface depicted in FIG. 7F. As shown in FIG. 7F, the user may be presented with contact list information 760, contact information 765 associated with the pizza place, and a "View" input mechanism 770 (e.g., a button, an icon, an input field, and/or other similar input mechanisms). Contact list information 760 may include names, telephone numbers, etc. of contacts associated with the user of user device 110. Contact information 765 may include the name, the telephone number, etc. associated with the pizza place.

If the user highlights one of the contacts (e.g., the pizza place) provided in contact list information 760 and selects "View" input mechanism 770, the user may be presented with the user interface depicted in FIG. 7G. As shown in FIG. 7G, the user may be presented with further contact information 775 associated with the pizza place. For example, the user may be presented with the name of the pizza place, the telephone number of the pizza place, the address (e.g., street, city, state, etc.) of the pizza place, a map providing directions to the pizza place, a menu of the pizza place, etc. In one exemplary implementation, user device 110 may determine a location of user device 110 (e.g., based on GPS coordinates associated with user device 110), and may provide directions to the pizza place based on the location of user device 110 and contact information 775 (e.g., the address of the pizza place) associated with the pizza place.

Although user interfaces 700 depict a variety of information, in other implementations, user interfaces 700 may depict less, additional, different, or differently arranged information than depicted in FIGS. 7A-7G.

FIG. 8 illustrates a flow chart of an exemplary process 800 for executing a script that causes a user device to auto-dial a telephone number and to selectively provide contact information in a contact list according to implementations described herein. In one implementation, process 800 may be performed by user device 110. In another implementation, some or all of process 800 may be performed by another device or group of devices, including or excluding user device 110.

As shown in FIG. 8, process 800 may include providing, by a user device, a directory assistance (DA) request to a DA server (block 810), receiving, from the DA server, information requested by the DA request (block 820), and receiving, from the DA server, a script that includes auto-dial instructions and/or contact list instructions (block 830). For example, in implementations described above in connection with FIG. 5, a user (e.g., via user device 110) may provide directory assistance (e.g., "411") call request 510 to directory assistance server 120. "411" call request 510 may include a request for a specific telephone number and/or address of a residence, business, etc. Directory assistance server 120 may receive "411" call request 510 and may determine information 520 requested by "411" call request 510. Information 520 may include a telephone number and/or contact information (e.g., an address, a map, a business name, a person's name, etc.) of a residence, business, etc. requested by "411" call request 510. Directory assistance server 120 may provide information 520 to user device 110 (e.g., via audible feedback, a text message, etc.). Based on "411" call request 510 and/or information 520, directory assistance server 120 may generate "411" script 530 (e.g., associated with "411" call request 510) that includes auto-dial instructions and/or contact list instructions. Directory assistance server 120 may provide "411" script 530 to user device 110.

As further shown in FIG. 8, the auto-dial instructions may be executed to cause the user device to auto-dial a telephone number requested by the DA request (block 840), the telephone number may be provided in a call log stored on the user device (block 850), and the telephone number may be provided in a last dialed log stored on the user device (block 860). For example, in implementations described above in connection with FIG. 6, auto-dial caller 610 of user device 110 may receive auto-dial instructions 660 from script determiner 600, and may execute auto-dial instructions 660, which may cause user device 110 to automatically dial (auto-dial) 680 telephone (phone) number 690 requested by "411" call request 510. In one example, auto-dial caller 610 may store telephone number 690 in call log 620 stored on user device 110 (e.g., in memory 410). In another example, auto-dial caller 610 may store telephone number 690 in last dialed log 630 stored on user device 110 (e.g., in memory 410). Alternatively and/or additionally, call log 620 and/or last dialed log 630 may be stored in a device other than user device 110 (e.g., but may be accessible to user device 110) and may include call information, such as type of calls, times, dates, telephone numbers, call lengths, etc.

Returning to FIG. 8, the contact list instructions may be executed to cause the user device to selectively provide contact information, requested by the DA request, in a contact list stored on the user device (block 870). For example, in implementations described above in connection with FIG. 6, contact list generator 640 of user device 110 may receive contact list instructions 670 from script determiner 600, and may execute contact list instructions 670, which may cause user device 110 to selectively provide contact information 695 (e.g., an address, a map, a business name, a person's name, etc.), requested by "411" call request 510, in contact list 650 stored on user device 110 (e.g., in memory 410). Alternatively and/or additionally, contact list 650 may be stored in a device other than user device 110 (e.g., but may be accessible to user device 110) and may include a list of contacts associated with the user of user device 110.

Figure 10:
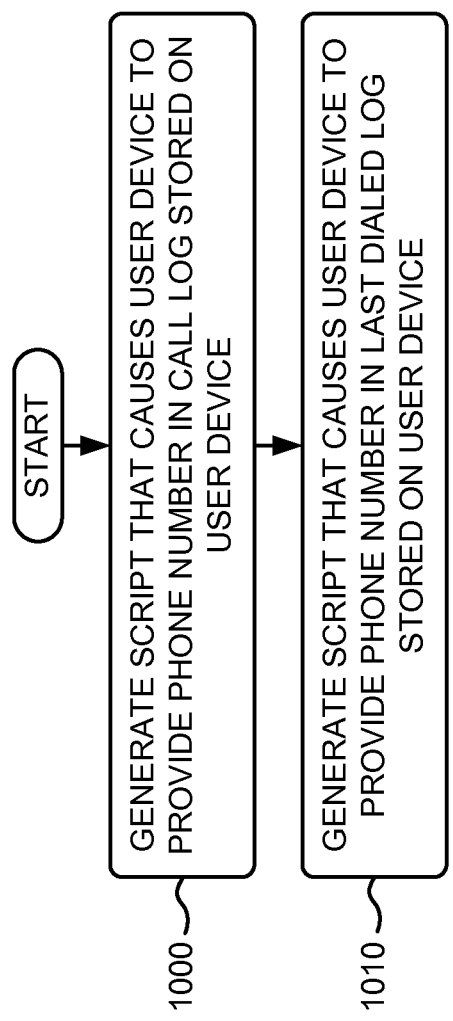

FIGS. 9 and 10 depict flow charts of an exemplary process 900 for providing, to a user device, a script that causes the user device to auto-dial a telephone number and to selectively provide contact information in a contact list according to implementations described herein. In one implementation, process 900 may be performed by directory assistance server 120. In another implementation, some or all of process 900 may be performed by another device or group of devices, including or excluding directory assistance server 120.

As illustrated in FIG. 9, process 900 may include receiving a directory assistance (DA) request from a user device (block 910), determining information requested by the DA request, where the information includes a telephone number and/or contact information requested by the DA request (block 920), and providing, to the user device, the information requested by the DA request (block 930). For example, in implementations described above in connection with FIG. 5, directory assistance server 120 may receive "411" call request 510 and may determine information 520 requested by "411" call request 510. In one example, directory assistance server 120 may include an interactive voice response system that utilizes speech recognition and recorded speech or speech synthesis to handle "411" call request 510 without live operator intervention. In another example, directory assistance server 120 may use database software to locate information 520 quickly, and may use an automated read back system to provide information 520. Information 520 may include a telephone number and/or contact information (e.g., an address, a map, a business name, a person's name, etc.) of a residence, business, etc. requested by "411" call request 510. Directory assistance server 120 may provide information 520 to user device 110 (e.g., via audible feedback, a text message, etc.).

As further shown in FIG. 9, a script that includes auto-dial instructions and/or contact list instructions may be generated, where the script may cause the user device to auto-dial the telephone number and/or to selectively provide the contact information in a contact list stored on the user device (block 940), and the generated script may be provided to the user device for execution (block 950). For example, in implementations described above in connection with FIG. 5, based on "411" call request 510 and/or information 520, directory assistance server 120 may generate "411" script 530 (e.g., associated with "411" call request 510) that includes auto-dial instructions and/or contact list instructions. "411" script 530 (e.g., via the auto-dial and/or contact list instructions) may cause user device 110 to auto-dial the telephone number requested by "411" call request 510 and/or to selectively provide the contact information (e.g., requested by "411" call request 510) in a contact list stored on user device 110. Directory assistance server 120 may provide "411" script 530 to user device 110 for execution.

Process block 940 may include the process blocks depicted in FIG. 10. As shown in FIG. 10, process block 940 may include generating a script that causes the user device to provide the telephone number in a call log stored on the user device (block 1000), and/or generating a script that causes the user device to provide the telephone number in a last dialed log stored on the user device (block 1010). For example, in implementations described above in connection with FIGS. 5 and 6, "411" script 530 (e.g., provided by directory assistance server 120) may include auto-dial instructions 660 and/or contact list instructions 670. In one example, auto-dial caller 610 of user device 110 (e.g., based on user device 110 execution of auto-dial instructions 660) may store telephone number 690 in call log 620 stored on user device 110 (e.g., in memory 410). In another example, auto-dial caller 610 (e.g., based on user device 110 execution of auto-dial instructions 660) may store telephone number 690 in last dialed log 630 stored on user device 110 (e.g., in memory 410).

Systems and/or methods described herein may enable a directory assistance (DA) server to provide a script to a user device in response to a DA request. The script may cause the user device to auto-dial a telephone number requested by the DA request and may cause the user device to selectively store contact information, requested by the DA request, in a contact list. In one implementation, for example, the systems and/or methods may provide, by a user device, a DA request to a DA server, and may receive, from the DA server, information requested by the DA request. The systems and/or methods may receive, from the DA server, a script that includes auto-dial instructions and/or contact list instructions, and may execute the auto-dial instructions to cause the user device to auto-dial a telephone number requested by the DA request. The systems and/or methods may provide the telephone number in a call log and/or a last dialed log stored on the user device, and may execute the contact list instructions to cause the user device to selectively provide contact information, requested by the DA request, in a contact list stored on the user device.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8-10, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   providing, by a mobile communication device, a directory assistance request to a directory assistance server;
   receiving, from the directory assistance server and by a script determiner of the mobile communication device, a directory assistance script,
   the directory assistance script including auto-dial instructions and contact list instructions,
   the auto-dial instructions including instructions that cause the mobile communication device to automatically dial a telephone number, requested by the directory assistance request, without an input from a user of the mobile communication device, and
   the contact list instructions including instructions that cause the mobile communication device to selectively store contact information, provided by the directory assistance server and requested by the directory assistance request, in a contact list associated with the mobile communication device;
   executing, by the mobile communication device, the auto-dial instructions to cause the mobile communication device to automatically dial the telephone number; and
   executing, by the mobile communication device, the contact list instructions to cause the mobile communication device to selectively store the contact information, provided by a directory assistance server and requested by the directory assistance request, in the contact list associated with the mobile communication device.

2. The method of claim 1, further comprising:
   receiving, from the directory assistance server, the telephone number and the contact information requested by the directory assistance request.

3. The method of claim 1, where the contact information includes one or more of: a name or an address associated with a residence or a business.

4. The method of claim 1, further comprising at least one of:
   storing the telephone number in a call log associated with the mobile communication device after executing the auto-dial instructions; or
   storing the telephone number in a last dialed log associated with the mobile communication device.

5. The method of claim 1, where the mobile communication device comprises one or more of:
   a radiotelephone,
   a personal communications system (PCS) terminal,
   a cellular telephone,
   a smart phone,
   a personal digital assistant (PDA), a laptop computer with a broadband air card, or
an Internet protocol (IP)-based device.

6. The method of claim 1, where the directory assistance request includes a 4-1-1 call to the directory assistance server.

7. The method of claim 1, where the directory assistance request includes an audible request, provided by the user of the mobile communication device, for the telephone number or an address.

8. The method of claim 1, where the directory assistance request includes a request, provided via a text message entered by the user of the mobile communication device, for the telephone number or an address.

9. A method comprising:
receiving, by a computing device, a directory assistance request from a user device;
determining, by the computing device, information requested by the directory assistance request,
the information including a telephone number and contact information requested by the directory assistance request;
generating, by the computing device and based on the information requested by the directory assistance request, a directory assistance script,
the directory assistance script including auto-dial instructions and contact list instructions,
the auto-dial instructions including instructions that cause the user device to automatically dial the telephone number without receiving an input from a user of the user device, and
the contact list instructions including instructions that cause the user device to selectively store the contact information, provided by the computing device to the user device as a response to the directory assistance request from the user device, in a contact list stored by the user device; and
providing, by the computing device, the directory assistance script to a script determiner of the user device.

10. The method of claim 9, further comprising:
providing, to the user device, the telephone number and the contact information requested by the directory assistance request.

11. The method of claim 9, where the auto-dial instructions further cause the user device to at least one of:
provide the telephone number in a call log stored by the user device after automatically dialing the telephone number based on the auto-dial instructions, or
provide the telephone number in a last dialed log stored by the user device.

12. The method of claim 9, where the computing device comprises one or more directory assistance servers.

13. The method of claim 9, where the directory assistance request includes a 4-1-1 call to the computing device.

14. The method of claim 9, where the directory assistance request includes an audible request, provided by the user of the user device, for the telephone number or an address.

15. The method of claim 9, where the directory assistance request includes a request, provided via a text message entered by the user of the user device, for the telephone number or an address.

16. A device comprising:
a memory to store a plurality of instructions; and
a processor to execute the plurality of instructions to:
provide a directory assistance request to a directory assistance server,
receive, from the directory assistance server, information requested by the directory assistance request,
the information including a telephone number and contact information requested by the directory assistance request,
receive, from the directory assistance server and by using a script determiner implemented by the processor, a directory assistance script,
the directory assistance script including auto-dial instructions and contact list instructions,
the auto-dial instructions including instructions that cause the device to automatically dial the telephone number without receiving an input from a user of the device, and
the contact list instructions including instructions that cause the device to selectively store the contact information, provided by the directory assistance server, in a contact list stored by the device,
execute the auto-dial instructions to cause the device to automatically dial the telephone number, and
execute the contact list instructions to cause the device to selectively store the contact information, provided by the directory assistance server, in the contact list.

17. The device of claim 16, where the processor is further to execute the plurality of instructions to at least one of:
provide the telephone number in a call log stored by the device after automatically dialing the telephone number based on the auto-dial instructions, or
provide the telephone number in a last dialed log stored by the device.

18. The device of claim 16, where the directory assistance request includes a 4-1-1 call to the directory assistance server.

19. The device of claim 16, where the directory assistance request includes an audible request, provided by the user of the device, for the telephone number or an address.

20. The device of claim 16, where the directory assistance request includes a request, provided via a text message entered by the user of the device, for the telephone number or an address.

21. A device comprising:
a memory to store a plurality of instructions; and
a processor to execute the plurality of instructions to:
receive a directory assistance request from a user device,
determine information requested by the directory assistance request,
the information including a telephone number and contact information requested by the directory assistance request,
provide, to the user device, the information requested by the directory assistance request,
generate, based on the telephone number and the contact information, a directory assistance script,
the directory assistance script including auto-dial instructions and contact list instructions,
the auto-dial instructions including instructions that cause the user device to automatically dial the telephone number without an input from a user of the user device, and
the contact list instructions including instructions that cause the user device to selectively store the contact information, provided by a directory assistance server included in the device, in a contact list stored by the user device, and
provide the directory assistance script to a script determiner of the user device.

22. The device of claim 21, where the auto-dial instructions further cause the user device to at least one of:

store the telephone number in a call log associated with the user device after automatically dialing the telephone number based on the auto-dial instructions, or store the telephone number in a last dialed log associated with the user device.

23. The device of claim 21, where the directory assistance request includes a 4-1-1 call to the device.

24. The device of claim 21, where the directory assistance request includes an audible request provided by the user of the user device.

25. The device of claim 21, where the directory assistance request includes a request provided via a text message entered by the user of the user device.

\* \* \* \* \*